(12) United States Patent
Gioutsos et al.

(10) Patent No.: US 6,278,924 B1
(45) Date of Patent: Aug. 21, 2001

(54) METHOD OF DETERMINING SAFETY SYSTEM DEPLOYMENT WITH CRASH VELOCITY INPUT

(75) Inventors: Tony Gioutsos; Daniel N. Tabar, both of Novi, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/552,503

(22) Filed: Apr. 19, 2000

(51) Int. Cl.$^7$ ............................................... B60R 21/32
(52) U.S. Cl. ............................ 701/45; 307/10.1; 280/735; 180/268
(58) Field of Search ........................ 701/45, 46, 47, 701/36; 280/728.1, 734, 735; 180/268, 271, 273; 307/10.1

(56) References Cited

U.S. PATENT DOCUMENTS

| | | | |
|---|---|---|---|
| 4,994,972 | 2/1991 | Diller | 364/242.05 |
| 5,587,906 | * 12/1996 | McIver et al. | 701/36 |
| 5,732,374 | * 3/1998 | Ohm | 701/45 |
| 5,785,347 | * 7/1998 | Adolph et al. | 280/735 |
| 5,835,007 | 11/1998 | Kosiak | 340/436 |
| 5,949,366 | 9/1999 | Herrmann | 342/72 |
| 6,036,225 | * 3/2000 | Foo et al. | 701/45 |
| 6,037,860 | * 3/2000 | Zander et al. | 701/45 |
| 6,186,539 | * 2/2001 | Foo et al. | 701/45 |

FOREIGN PATENT DOCUMENTS 19610833    9/1996    (DE) .

OTHER PUBLICATIONS

RL Phen et al: "Advanced Air Bag Technology Assessment—Final Report" NHTSA Apr. 1998, XP002137509.
Kosiak WK et al: "Future Trends in Restraint Systems Electronics" Automotive Engineering International, SAE International, US, vol. 107, No. 9, Sep. 1999, ISSN: 0098–2571 (The whole document).

* cited by examiner

*Primary Examiner*—Gary Chin
(74) *Attorney, Agent, or Firm*—Lonnie Drayer

(57) ABSTRACT

Motor vehicle safety system deployment is controlled by a biomechanical algorithm that considers a normalized frontal crash velocity and vehicle occupant status in determining safety system deployment strategy. Normalized frontal velocity is determined either by a radar type crash velocity detection system or by adjusting the radar velocity towards a crash velocity determined based on time-to-fire as determined by a single-point algorithm. The radar velocity or the adjusted greater velocity is normalized if necessary for crash type to a frontal velocity equivalent.

12 Claims, 3 Drawing Sheets

METHOD OF DETERMINING SAFETY SYSTEM DEPLOYMENT WITH CRASH VELOCITY INPUT

FIELD OF THE INVENTION

The present invention relates to logic systems used to control motor vehicle safety system deployment in general and to systems employing multi-step logic and multiple inputs in particular.

BACKGROUND OF THE INVENTION

Recent advances in motor vehicle safety systems involve systems that deploy various safety systems differently depending on various crash-related parameters. Typical safety systems deployed include airbags, multistage airbags, side impact airbags, seat belt tensioners and the like. The growing capacity of modern safety systems allows variations in deployment responding to the severity of a crash, and the weight and position of the vehicle occupant. The growing safety system capabilities together with improvements in the engineering understanding of the crash environment, has led to tailoring the deployment decision to consider more than simply a threshold test. Particularly with multistage airbags, information about crash severity, and vehicle occupant type and position are being used to determine deployment timing and strategy.

Data from an acceleration sensor is typically verified by a mechanical crash sensor, then analyzed to determine crash severity and crash type. Empirically derived relationships between the magnitude of the accelerations measured and the rate of onset of acceleration are used together with vehicle-specific parameters to select a deployment strategy. In a severe crash the time available for analysis is very short, and the deployment decision must be made with only a limited amount of acceleration data. Although acceleration can be integrated to determine velocity, very little velocity is lost before most of the damage occurs. Thus by the time acceleration data gives an indication of crash velocity it is too late for effective deployment of safety systems.

Crash velocity is important data input because the energy of a moving system increases with the square of the velocity. Relatively small increases in crash velocity result in substantially more energy being dissipated by the crash. Ultimately, energy dissipated in a crash characterizes to a significant extent the severity of the crash. Systems to detect imminent crashes have been developed. For example U.S. Pat. No. 5,949,366 to Herrmann teaches a system using radar which can determine crash velocity and lateral offset of a crash.

What is needed is a method of combining velocity of impact with acceleration data, and with biomechanical parameters to develop a more optimal safety device deployment strategy.

SUMMARY OF THE INVENTION

The safety system deployment method of this invention includes the steps of continuously monitoring velocity with respect to objects that are approaching a motor vehicle. When a crash is determined to be taking place based on accelerometer data a velocity of impact value is determined. This value is initially used to determine minimum conditions under which a safety system fire decision will be made. In other words, the velocity of the crash is used to set a minimum velocity, e.g. 22.5 kilometer per hour (14 miles per hour), below which safety system deployment will not be enabled.

A deployment logic system uses accelerometer data to determine the type of crash, e.g., frontal, pole impact, or angular impact, and the severity of the crash. The deployment logic system determines a point in time for safety system deployment initiation based on crash type and severity. When a deployment/fire decision is made, this determines the time-to-fire from detection of the crash onset. The accelerometer based deployment logic system is referred to as a single-point algorithm; and the single-point algorithm uses acceleration data to make the fire decision.

The second system receives the fire decision and transmits the decision to a biomechanical algorithm together with the normalized frontal velocity. Normalized frontal velocity is a good indicator of crash severity. The biomechanical algorithm utilizes the normalized frontal velocity to determine deployment sequence and strategy. The second system employs a second algorithm that takes as inputs the time-to-fire and crash type from the single-point algorithm, together with the velocity-of-crash value from the radar, and performs two operations on the inputs. The first operation is to compare an empirically derived correlation between time-to-fire and crash velocity, with the time-to-fire produced by the single-point algorithm based on accelerometer data. If the single-point time-to-fire is less than the empirically derived time-to-fire, then the radar velocity is a good indication of crash severity. If the single-point time-to-fire is greater than the empirically derived time-to-fire, then the radar indicated crash velocity overstates the severity of the crash, and a velocity between the single-point and the empirically derived time-to-fire is selected in accordance with a function.

The empirically derived correlation between velocity and time-to-fire is derived for each crash type and thus the single-point time-to-fire is compared to a different empirical correlation for each crash type.

The second operation that the second system performs is to normalize the velocity value for non-frontal crash situations to a frontal crash equivalent velocity. This normalized frontal velocity is transmitted to the biomechanical algorithm which considers vehicle occupant status sensor input data, and employs an algorithm, typically a lookup table, to choose the appropriate safety system to deploy or not as the algorithm determines, based on normalized frontal crash velocity and vehicle occupant specific parameters.

It is a feature of the present invention to provide a method of deploying motor vehicle safety systems that considers velocity of impact.

It is a further feature of the present convention to provide a method of adjusting measured velocity in view of time-to-fire times derived from crash accelerations.

It is another feature of the present invention to provide a method of normalizing crash velocity for non-frontal crashes to a frontal crash equivalent velocity.

Further objects, features and advantages of the invention will be apparent from the following detailed description when taken in conjunction with the accompanying drawings.

DETAILED DESCRIPTION OF THE INVENTION

Figure 1:
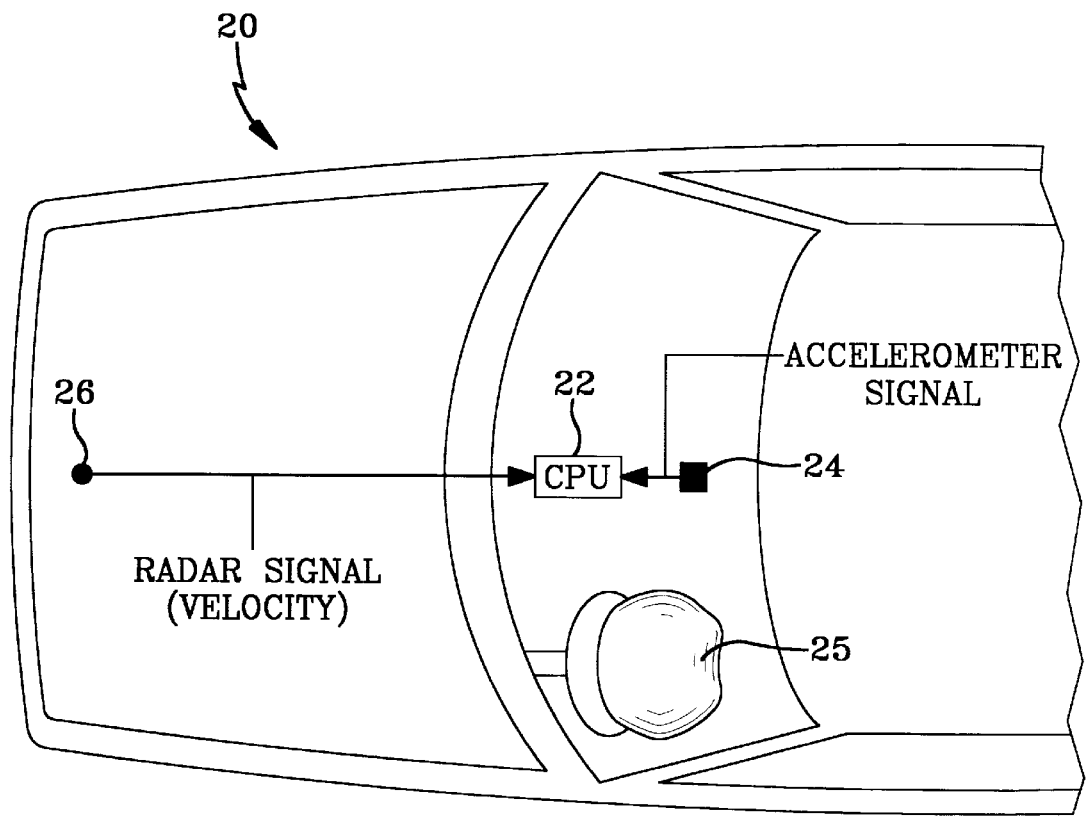
FIG. 1 is a pictorial view of a motor vehicle showing the placement of the components employed with the safety system deployment method of this invention.

Referring more particularly to FIGS. 1 to 6, wherein like numbers refer to similar parts, a schematic motor vehicle 20 is depicted in FIG. 1. Algorithms implemented on a central processing unit 22 consider inputs from an accelerometer 24 and a forward mounted radar unit 26 and decide if, when, and how to deploy various safety systems 25 within the motor vehicle 20. Previously known algorithms typically consider only input from one or more accelerometers. The problem with accelerometer data is that it can be difficult to differentiate between events which may not require the deployment of safety systems, such as striking a road hazard or a deer, and a crash into a fixed or moving object which does require deployment of safety devices.

It is of course expensive and inconvenient to have safety systems deploy when they are not necessary to prevent injury. On the other hand, it is desirable to deploy safety systems in every situation where they would contribute significantly to vehicle occupant safety. Thus safety system deployment logic attempts to differentiate between events which require safety system deployment and events which do not require safety system deployment.

Figure 2:
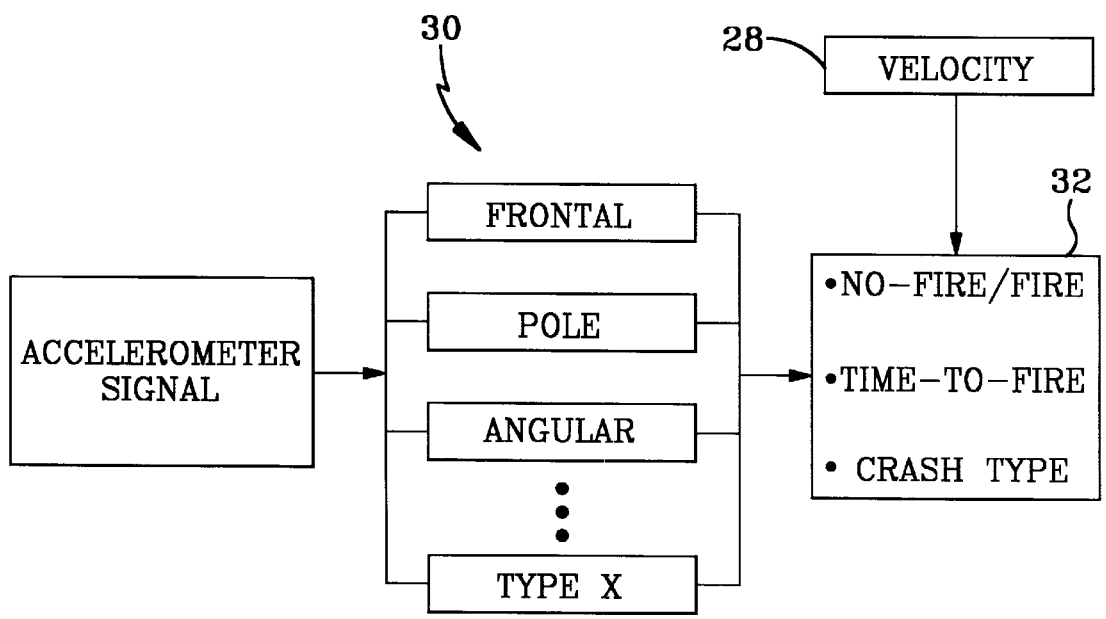
FIG. 2 is a flow diagram of a single-point algorithm which determines impact type and time-to-fire from accelerometer data, and which considers minimum velocity in making a no-fire/fire decision.

A system has been developed which utilize a single-point algorithm to extract a classification of the crash type from accelerometer data, by employing various functions such as derivatives, integrals, etc. The single-point algorithm also makes a fire/no-fire decision based on accelerometer data. A fire decision allows determination of an estimated time-to-fire, i.e.: the time between crash onset and the time of the fire decision. FIG. 2 illustrates the inputs and outputs of the single-point algorithm. A single-point algorithm can be improved by the addition of velocity input 28. The velocity input 28 is used to determine a velocity threshold below which no decision to deploy the safety systems is made. A typical minimum velocity might be 22.5 kilometers per hour (14 miles per hour), however this value is vehicle dependent.

Knowledge of the velocity at which a crash takes place cannot simply be taken from the speedometer of a motor vehicle, because the crash may take place with an object moving toward or away from the motor vehicle. The velocity of an object closing with a motor vehicle may be obtained by repeatedly ranging objects that are in the vicinity of the motor vehicle or by using the frequency shift associated with radio waves reflected from a moving object. Where Doppler radar is used, the return signal can be analyzed for frequency shifts that are directly proportional to the velocity of the reflecting object relative to the transmitter mounted on the motor vehicle. Systems for detecting the velocity of approaching objects have been developed for automatic cruise control, out-of-view object detection, and automatic breaking.

One crucial capability of the radar velocity detection system is that it is able to calculate potential crash speeds continuously, with little time duration between calculations, and is able to operate under extreme environmental conditions. Operation under extreme environmental conditions may require self-calibration and a selection of transmitter radio frequencies that are not significantly affected by weather. Such a system can provide velocity of approaching objects to the central processing unit ("CPU") 22 continuously, and the CPU can select a specific velocity value when it determines a crash is taking place based on analysis of the output of the accelerometer 24. However the radar system is greatly simplify from radar systems which attempt to determine attributes of the object with which the crash is taking place other than velocity, such as size, shaped, mass. The attributes of the object with which the crash is taking place are determined by analyzing the output of the accelerometer thus simplify the design of the radar that need only determine velocity of the crash.

Figure 3:
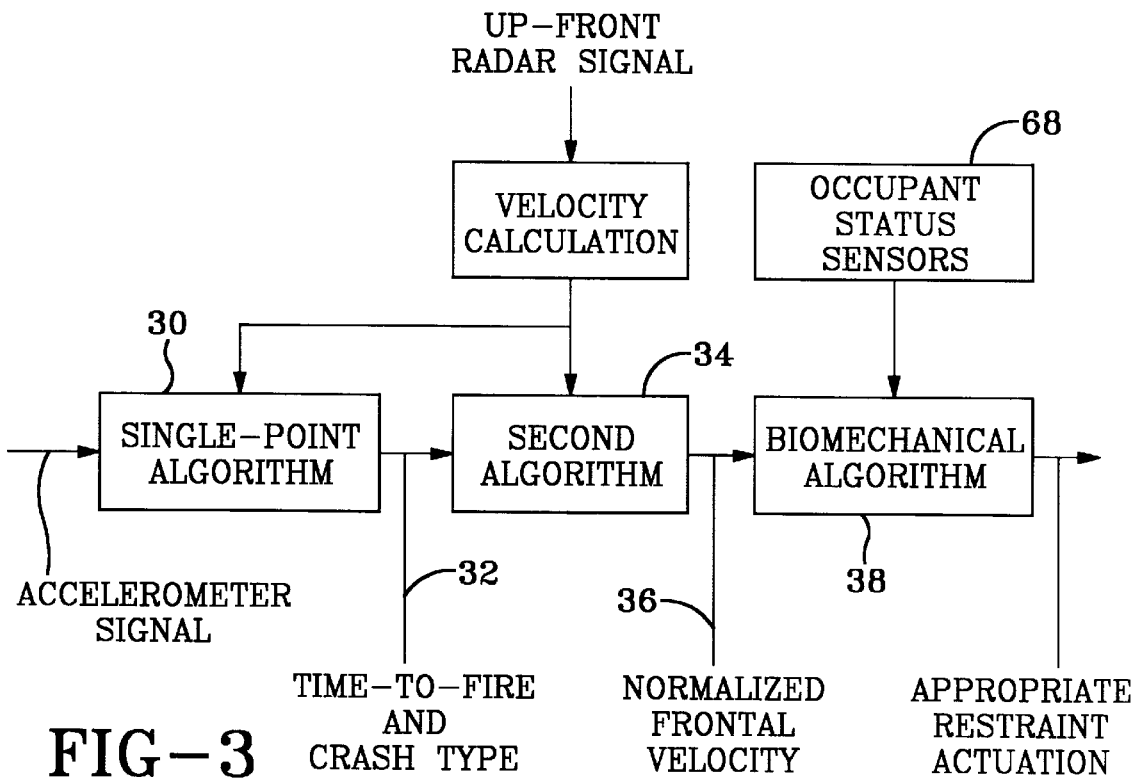
FIG. 3 is a flow diagram of an algorithm for implementing the safety system deployment method of this invention.

The single-point algorithm 30 provides two outputs 32 to a second algorithm 34 as depicted in FIG. 3. The outputs 32 of the single-point algorithm 30 are a time-to-fire value, which implicitly includes a fire decision, and a crash type value. The single-point algorithm determines the time-to-fire as the time between the determination of the beginning of a crash and the point where the single point algorithm decides the safety system should be activated. U.S. Pat. No. 4,994,972 to Diller teaches a method of determining time-to-fire which may be employed in the practice of the present invention and is therefore incorporated herein by reference for that purpose.

The single-point algorithm 30 can issue a fire decision for each crash type, and, assuming the first fire decision results in non-deployment or partial deployment, by the biomechanical algorithm, a later fire decision may result in deployment, or deployment of additional stages of a multi-stage airbag. The crash type is simply a word or numerical value which corresponds to a particular state of the single-point algorithm output. The state corresponds to a crash category, for example: a frontal crash, a crash into a pole, a crash at an angle to the front, and other crash types. The state may be a discrete one, or may be a continuously varying value.

The second algorithm 34 outputs a normalized frontal velocity 36 as shown in FIG. 3 to a third, biomechanical algorithm 38. The operation of the second algorithm 34 combines known radar based crash velocity 28 with the outputs 32 of the single-point algorithm 30 to produce the normalized frontal velocity 36.

The second algorithm 34 employs an empirically derived relationship between radar determined crash velocity and expected time-to-fire for each crash type.

Measured time-to-fire is a function of crash velocity and other factors. These other factors may be artifacts of the way the zero point is set. For example, the motor vehicle might hit a hole in the roadway just before impacting a barrier, resulting in an early setting of the zero point due to the hole in the roadway, increasing observed time-to-fire. More importantly, a crash into a more yielding object, such as a crash barrier, versus a concrete wall, results in lower accelerations which are indicative of a less severe crash which in turn result in a longer time before the fire decision is made. Different crash types have a definite relationship between time-to-fire and crash velocity. However, within a crash type, time-to-fire may be greater than expected due to factors discussed above.

Figure 4:
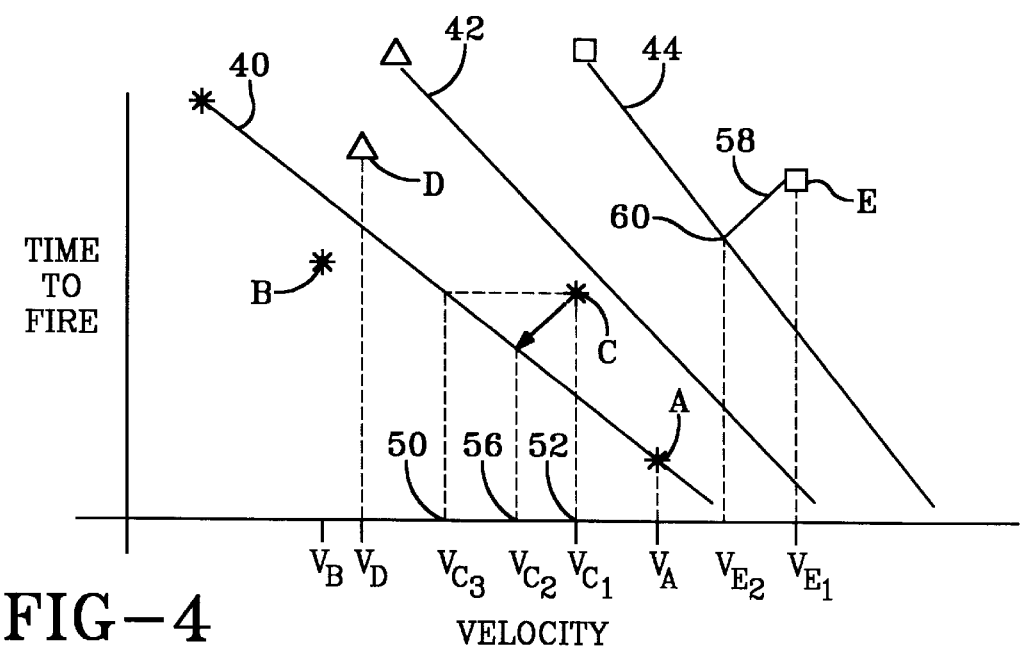
FIG. 4 is a graphical representation of the method step of adjusting radar-determined velocity based on time-to-fire.

The empirical relationship for a frontal crash is represented by the lower line 40 in FIG. 4. The relationship for a pole crash is represented by the second line 42, and for an angular crash is represented by a third line 44. From the relative position of the lines 40, 42, 44 it is evident that a frontal crash is the most severe type resulting in the shortest time-to-fire values for a given crash velocity (neglecting certain types of undercarriage crashes).

When the time to fire of the single point algorithm is plotted against the closing velocity as determined by the radar, a crash point is established in the two-dimensional space of the chart of FIG. 4. Depending on the position of the established crash point on the chart, the radar velocity may be seen to overstate or understate the severity of the crash. If a crash point B falls below the line 40 representing the empirically derived relationship between radar-determined crash velocity and time-to-fire for frontal crashes, the radar velocity VB is a realistic assessment of the frontal crash velocity. Likewise, if a crash point A again for a frontal crash event is established which falls on the line 40 representing the empirically derived relationship between time-to-fire and closing velocity, again the radar velocity VA is a realistic assessment of the frontal crash velocity.

Figure 5:
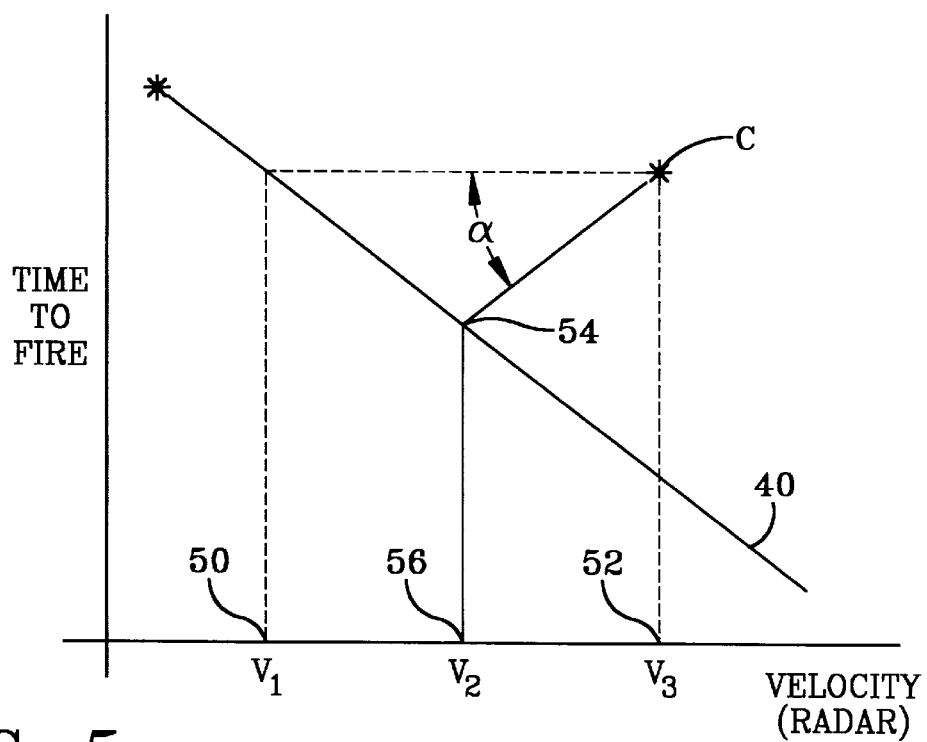
FIG. 5 is a graphical representation of how velocity determined from time-to-fire values and velocity from radar are combined.

If however, as illustrated in FIGS. 4 and 5, a crash point C for a frontal crash is plotted above the line 40 representing the empirically derived relationship. It is then apparent that the single point algorithm has determined a time-to-fire 50 substantially longer than the time-to-fire 52 predicted based on radar determined velocity. This means that the object with which the motor vehicle is colliding is producing a crash of less severity than a nominal frontal crash, or the estimate of time-to-fire was incorrectly determined. If the estimated time-to-fire is incorrect, is set to 85–90 degrees i.e. the radar determined velocity is selected.

Thus, as a general principle, where a crash point falls at or below the empirically derived line, then the frontal velocity obtained by radar is not adjusted. If, on the other hand, the time-to-fire determined by the single point algorithm is positioned above the empirically derived line, then an operation is performed on the crash point value to determine an adjusted frontal velocity.

FIG. 5 illustrates a graphical representation of performance of this operation in determining a value 54 which corresponds to a velocity 56 which is between the velocity corresponding to the single-point time-to-fire 50 and the radar determined velocity 52. This determination is accomplished by selecting an angle that transfers the point C to the empirically determined line 40 at a point 54. The frontal velocity 56 corresponding to this point 54 is then selected. If is selected at forty-five degrees from the horizontal as illustrated in FIG. 5, the radar velocity 52 is essentially averaged with the velocity 50 implicit in the single-point determined time-to-fire.

An angle of zero degrees corresponds to using only the velocity 50 determined by the single-point algorithm time-to-fire value, and an angle of ninety degrees corresponds to using the radar determined velocity. The angle may be simply a constant value, empirically derived, or it may be derived through simulation. The angle may also be determined by a function that varies with crash type, or crash velocity.

A similar process is undertaken for crash points associated with crash types other that frontal, utilizing empirically derived lines or functions for those crash types. Crash point D, as shown in FIG. 4 for a pole type crash, has a time-to-fire below line 42 indicating the radar determined velocity VD should be used in subsequent steps within the second algorithm.

Crash point E for an angle type crash has a single-point algorithm time-to-fire which is greater than predicted by the empirically derived relationship 44 between radar velocity VE1 and time-to-fire and so is adjusted by the operation discussed with respect to FIG. 5, and is transferred to a point 60 on the line 44 as indicated by line 58 resulting in an adjusted velocity for an angular crash velocity VE2.

Figure 6:
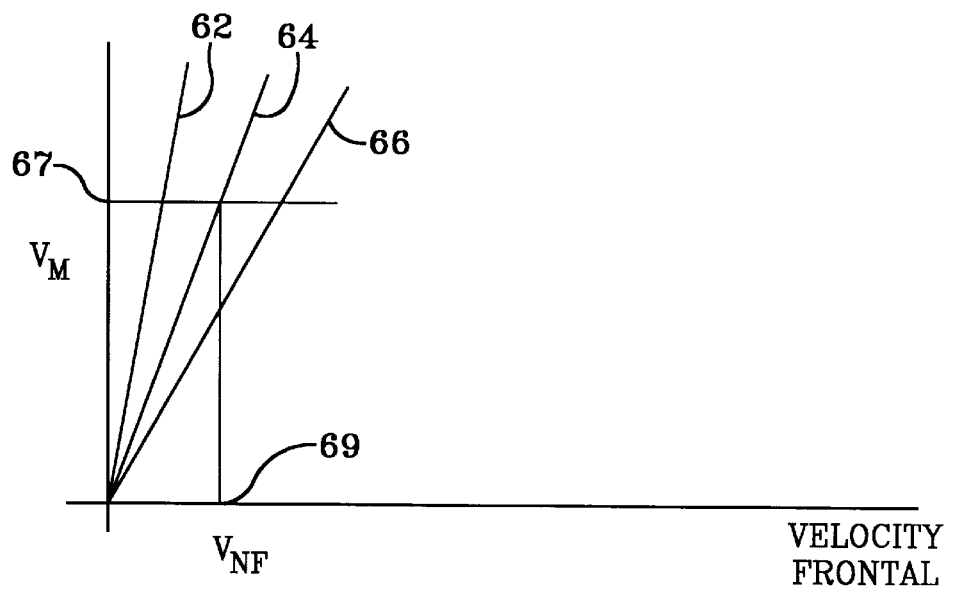
FIG. 6 is a graphical representation of how non-frontal crash velocities are normalized to equivalent frontal crash velocities.

The second algorithm 34 in addition performs a normalization of the velocity 28 determined by the radar 26 if the crash type is other than frontal. The normalization is illustrated in FIG. 6. A frontal crash is the most severe for a given velocity. Therefore the transfer functions represented by lines 62, 64, 66, reduce the measured velocity or the velocity determined via the transfer function, 67 to a normalized frontal velocity 69 for non-frontal crashes.

The second algorithm 34 outputs a radar velocity adjusted if necessary by time-to-fire data and normalized if the crash type is other then normal. The second algorithm takes essentially no time and thus directly transmits the decision to fire to the biomechanical algorithm 38 together with the normalized frontal velocity.

The biomechanical algorithm 38 receives input from vehicle occupant status sensors 68 that may comprise sensors that detect vehicle occupant size, weight, position within the motor vehicle, seat belt buckle status, etc. The biomechanical algorithm 38 using a lookup table type logic then decides what if any safety systems should be deployed based on vehicle occupant status and normalized frontal velocity. Typically, with a multi-stage airbag, the biomechanical algorithm will determine how many stages should be fired. Other examples of decisions of the biomechanical algorithm are: whether a side impact airbag should be deployed, and whether body positioning devices should be deployed. The normalized frontal velocity is the best predictor of crash severity and the biomechanical element 38 is designed to produce the best results by basing system deployment on vehicle occupant status and crash severity.

It should be understood that a velocity value could be obtained from a number of different systems. Such systems are known from technology used for automatic cruise control, out-of-view object detection, and automatic braking. The technology employed could have a single or multiple up-front radar sensors or could employ Doppler radar techniques, or repeated ranging, or range gating. Ultrasonics using micropulses, or optical techniques could be employed to determine crash velocity.

It should be understood that a passenger compartment electronic sensing module consisting of an accelerometer and a CPU would normally be located on the centerline of the motor vehicle near the vehicle occupants. The electronic sensing module will typically incorporate a chip-based accelerometer to provide acceleration data and one or more mechanical shock sensors, typically based on reed switch technology, to provide confirmation that a crash is taking place.

It should also be understood that wherein discrete functions or linear relationships are depicted for transfer functions, such relationships may be described by a mathematical equation of first, second or higher order. For example, crash type may be a discrete value or a continuous function.

It should be understood that although the fire decision of the single-point algorithm is transmitted to the second algorithm and then to the biomechanical algorithm, the time at which safety systems will be deployed, in various safety systems, particularly those deploying multi-stage airbags, some events may be somewhat after other events.

It is understood that the invention is not limited to the particular construction and arrangement of parts herein illustrated and described, but embraces such modified forms thereof as come within the scope of the following claims.

We claim:

1. A method for deploying a safety device during a crash event involving a motor vehicle, comprising:

monitoring the immediate vicinity of the motor vehicle by illuminating the surrounding environment with electromagnetic radiation and receiving said illuminating electromagnetic radiation from objects positioned near the motor vehicle, and analyzing said received electromagnetic radiation to determine velocity of objects in the vicinity of the motor vehicle relative to the motor vehicle;

sensing motor vehicle acceleration to detect the onset of a crash event, and, when the crash event is detected, selecting a first velocity corresponding to an object that is colliding with the motor vehicle;

performing analysis on said acceleration and functions of said acceleration and based on said analysis making a fire/no-fire decision, wherein a fire decision determines a time-to-fire, and includes determining a parameter which characterizes the crash;

determining from a previously derived relationship between motor vehicle velocity and time-to-fire, a second velocity;

comparing the first velocity with the second velocity, and, if the second velocity is greater than the first velocity, selecting the first velocity, and if the second velocity is less than the first velocity, selecting a third velocity which is between the first velocity and the second velocity;

if the parameter which characterizes the crash indicates a crash which is non-frontal, normalizing the selected velocity to a normalized velocity corresponding to an equivalent frontal crash;

supplying the selected velocity or, if determined, the normalized velocity, to a biomechanical algorithm;

deriving from the biomechanical algorithm a list of actuations to be initiated; and initiating the list of actuations.

2. The method of claim 1 wherein the step of selecting a third velocity which is between the first velocity and the second velocity is by selecting an angle which transfers the first velocity to a point on an empirically determined line representing the previously derived relationship between motor vehicle velocity and time-to-fire, and wherein the selected velocity is made to correspond to the point.

3. The method of claim 1 wherein the parameter that characterizes the crash is selected from the group consisting of a pole crash, a frontal crash, and an angular crash.

4. The method of claim 1 wherein the previously derived relationship between motor vehicle velocity and time-to-fire is determined empirically.

5. The method of claim 1 further comprising a step of inhibiting the decision to fire if the selected velocity is below a predetermined value.

6. A method for deploying a safety device during a crash event within a motor vehicle, comprising:

monitoring the immediate vicinity of the motor vehicle to determine velocity of objects in the vicinity of the motor vehicle relative to the motor vehicle;

sensing motor vehicle acceleration to detect the onset of a crash event, and, when the crash event is detected, selecting a first velocity corresponding to an object which is colliding with the motor vehicle;

performing analysis on said acceleration and functions of said acceleration and based on said analysis making a fire/no-fire decision, wherein a fire decision includes determining a time-to-fire, and determining a parameter which characterizes the crash;

determining from a previously derived relationship between motor vehicle velocity and time-to-fire, a second velocity;

comparing the first velocity with the second velocity, and, if the second velocity is greater than the first velocity, selecting the first velocity, and if the second velocity is less than the first velocity, selecting a third velocity which is between the first velocity and the second velocity;

if the parameter which characterizes the crash indicates a crash which is non-frontal, normalizing the selected velocity to a normalized velocity corresponding to an equivalent frontal crash;

supplying the selected velocity or, if determined, the normalized velocity, to a biomechanical algorithm;

deriving from the biomechanical algorithm a list of actuations to be initiated; and initiating the list of actuations.

7. The method of claim 6 wherein the parameter that characterizes the crash is selected from the group consisting of a pole crash, a frontal crash, and an angular crash.

8. The method of claim 6 wherein the previously derived relationship between motor vehicle velocity and time-to-fire is determined empirically.

9. The method of claim 6 further comprising a step of inhibiting the decision to fire if the selected velocity is below a predetermined value.

10. A method of combining an accelerometer based velocity determination and radar based velocity determination, to produce a frontal crash velocity equivalent comprising the steps of:

monitoring the immediate vicinity of a motor vehicle by a radar to determine velocity of objects in the vicinity of the motor vehicle relative to the motor vehicle;

sensing motor vehicle acceleration by an accelerometer to detect the onset of a crash event, and, when the crash event is detected, selecting a first velocity corresponding to an object that is colliding with the motor vehicle;

determining an empirical relationship between velocity of collision and time-to-fire produced by a single-point algorithm;

determining from the relationship a second velocity correlated to a particular crash time-to-fire; and if the second velocity is less than the first velocity, selecting a third velocity between the first velocity and the second velocity to produce said frontal crash velocity equivalent.

11. The method of claim 10 wherein the third velocity is an average of the first velocity and the second velocity.

12. The method of claim 11 further comprising the steps of:

normalizing the third velocity of collision to an equivalent frontal crash velocity; and transmitting the third velocity to a biomechanical algorithm which selects safety systems to be deployed based on the third velocity.

* * * * *